Dec. 24, 1968   J. P. SWANSON   3,417,845
ACTUATING SYSTEM FOR MULTI-RATIO TRANSMISSION
Filed April 6, 1967   4 Sheets-Sheet 2
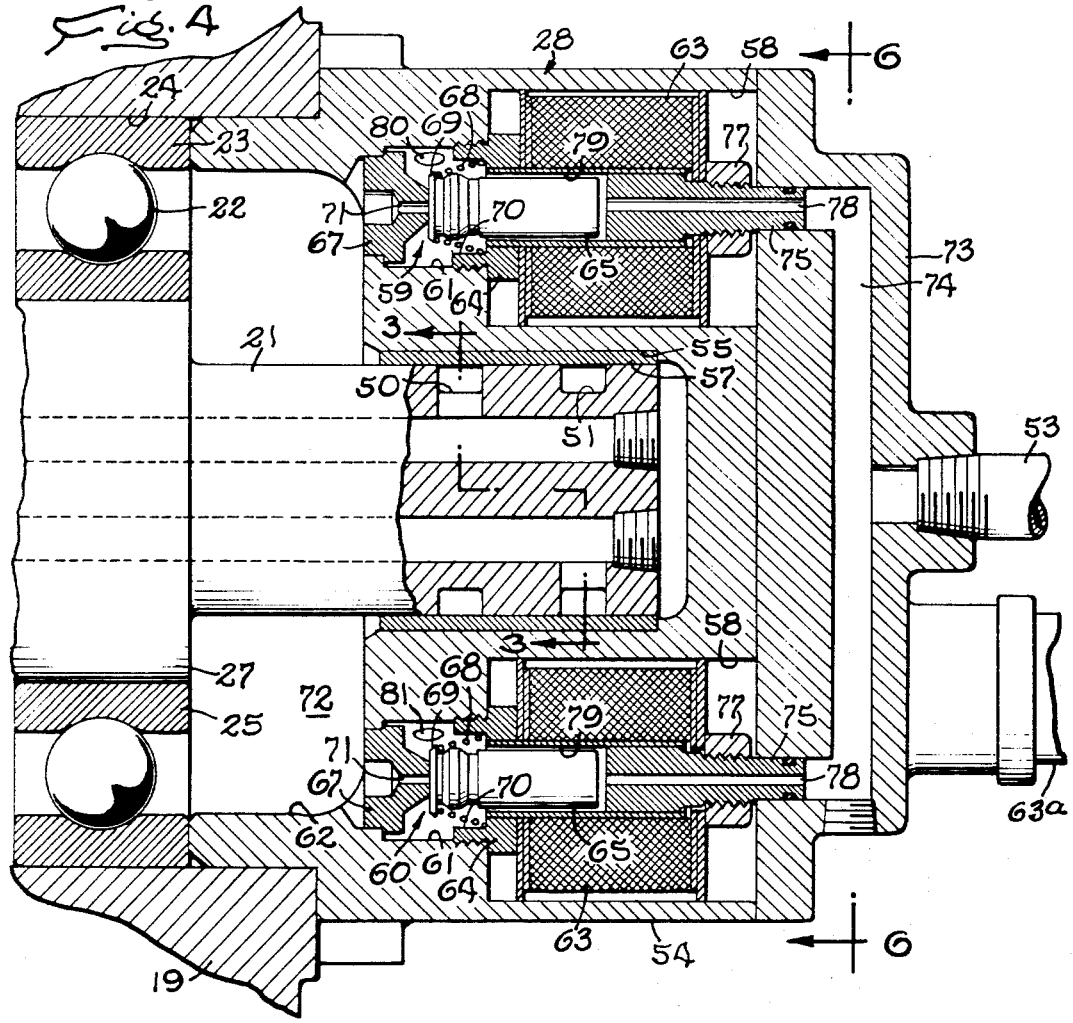
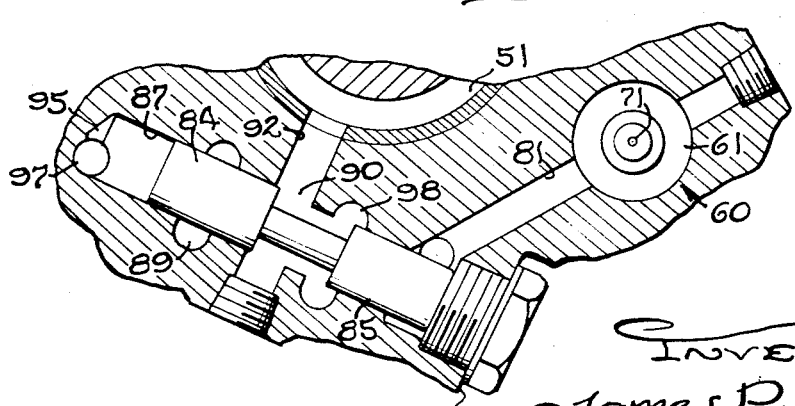
INVENTOR
James P. Swanson
by Wolf, Hubbard, Voit & Osann
ATTORNEYS

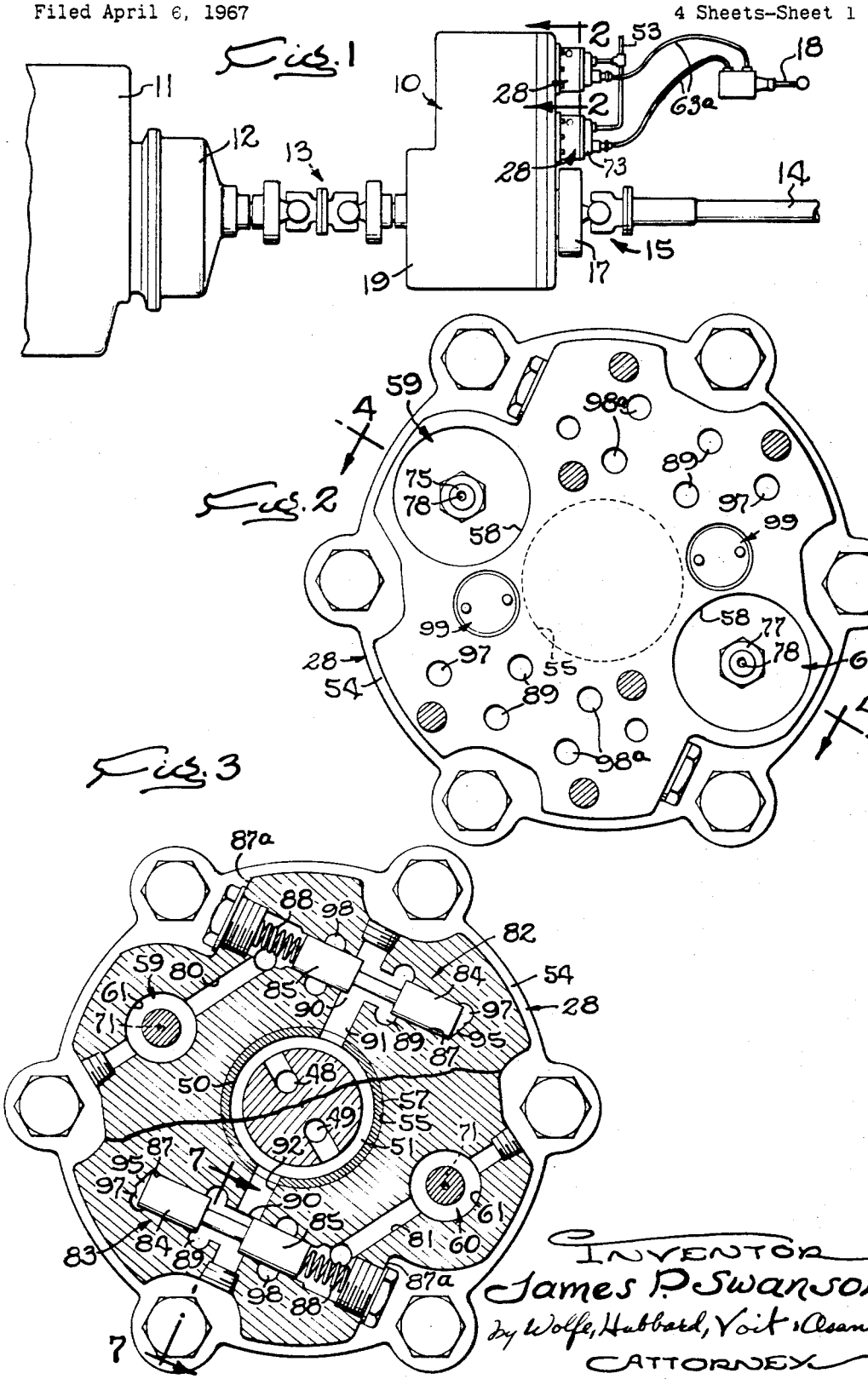

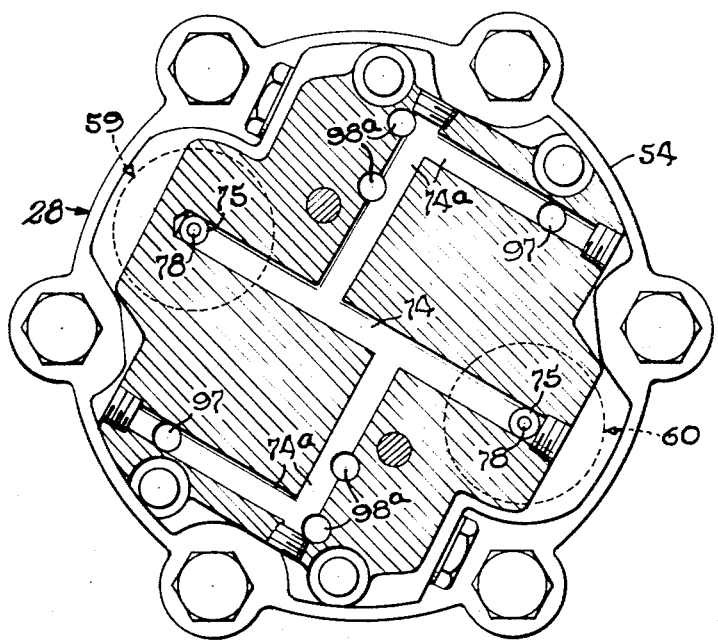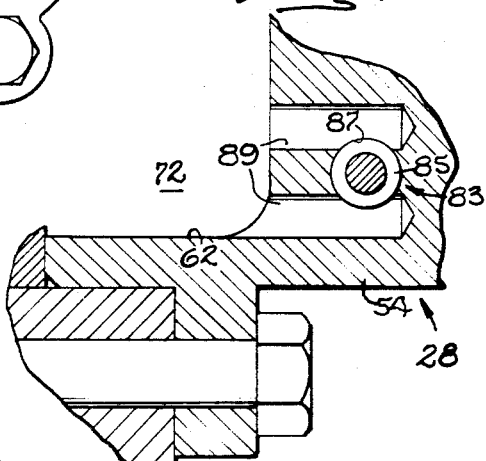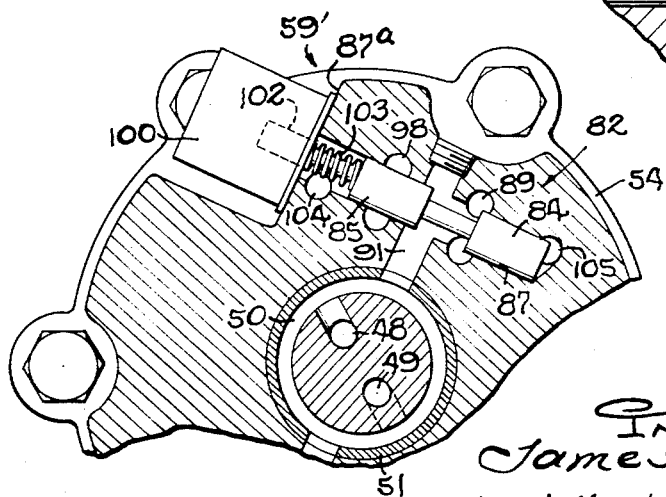

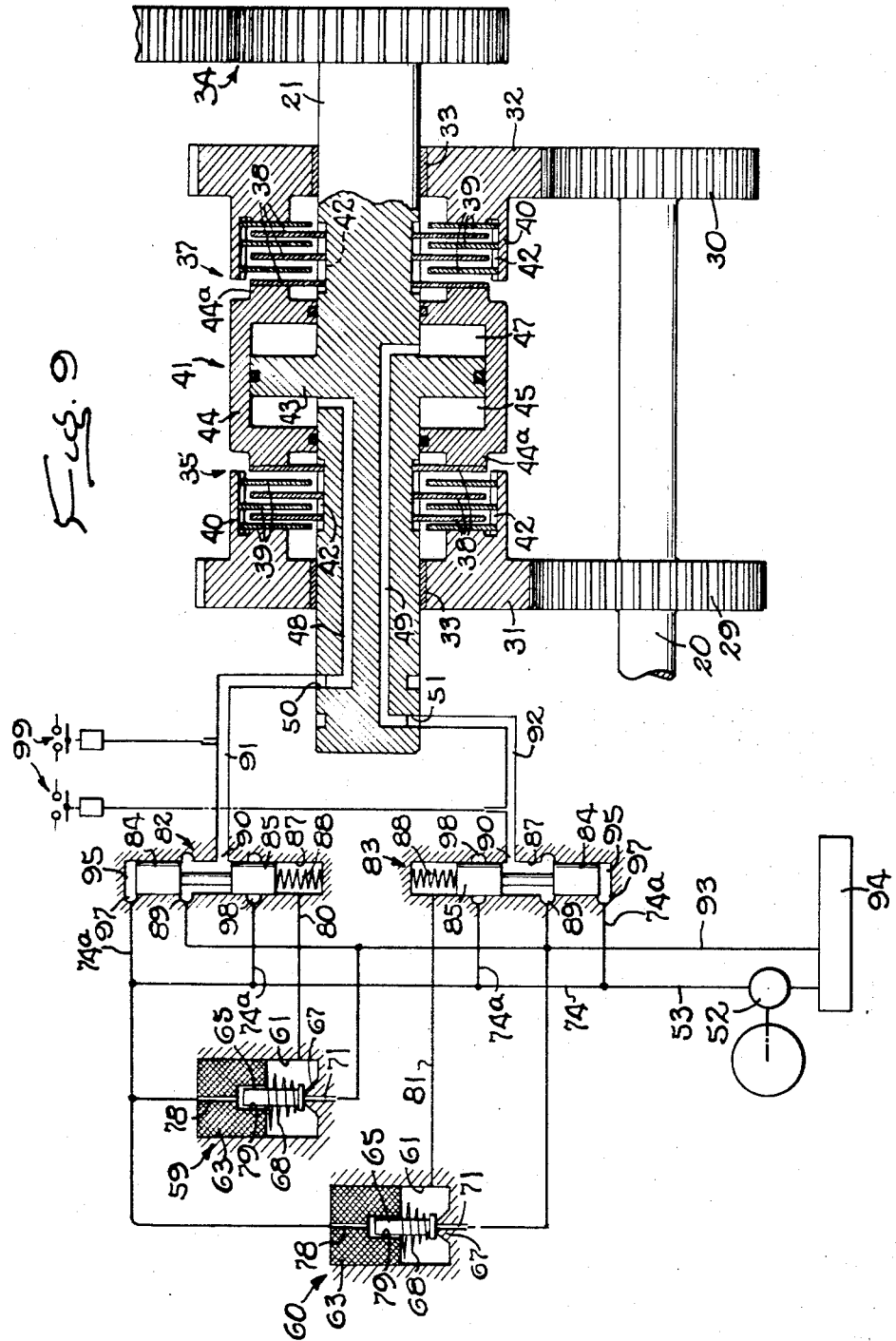

United States Patent Office 3,417,845
Patented Dec. 24, 1968

3,417,845
ACTUATING SYSTEM FOR MULTI-RATIO TRANSMISSION
James P. Swanson, Winnebago, Ill., assignor to Twin Disc Clutch Company, Racine, Wis., a corporation of Wisconsin
Filed Apr. 6, 1967, Ser. No. 628,897
9 Claims. (Cl. 192—87.19)

ABSTRACT OF THE DISCLOSURE

A multi-ratio transmission having input shafts driven by a prime mover and adapted to be coupled to an output shaft through different sets of gears providing different drive ratios. The sets of transmission gears on each input shaft are journaled on the shaft for selective coupling thereto by two disk clutches actuated by a hydraulic cylinder movable back and forth relative to a fixed piston on the shaft in response to the delivery of pressure fluid to the opposite ends of the cylinder through passages in the shaft. A bearing cap covering the exposed end of each input shaft houses two valve mechanisms each including a solenoid valve adapted to be energized from a remote location, and a slave valve operated by the solenoid valve to transmit pressure fluid to an end of the clutch cylinder from a single line supplying pressure fluid to the bearing cap and thus to the cylinder. In the modified form, the solenoids are directly connected to the control valve spools.

Background of the invention

This invention relates to multi-ratio transmissions of the type having at least one input shaft and an output shaft adapted to be coupled together by different sets of gears providing different drive ratios and, more particularly, to the fluid actuation of clutch mechanisms for selectively coupling the different sets of gears on demand in response to signals from the operator of a driven mechanism such as a crawler-type tractor. The basic construction of such transmissions is well known to those skilled in the art, the present invention being concerned with the manner of controlling the flow of pressure fluid to the fluid actuated clutches in response to the signals from the operator.

In past systems for controlling such transmissions, the practice has been to deliver the actuating fluid to the clutches from control valves in a position remote from the transmission and communicating with the clutch actuators through suitable tubing or hoses leading to the transmission housing and to passages formed in the input shafts. Thus, hydraulic signals are transmitted to the transmission through relatively long, expensive and space-consuming connections that are capable of leaking in service use.

Brief summary of the invention

The primary object of the invention is to eliminate the need for tubing, clamps and other connections between the control valves and the transmission housing and to reduce to a minimum the distance between the valves and the clutch actuators, thereby simplifying the construction of the control and also minimizing the time delay between initiation of each signal and response by the transmission. A more specific object is to utilize the usual bearing cap of the output shaft as a housing for the control valve mechanism, and to mount the latter on or in the caps in a compact and relatively simple manner for actuation by an outside signal, such as an electrical signal, for immediate delivery of actuating fluid to the shaft passages on demand, virtually eliminating time lags between the actuation of a valve and the engagement of the associated clutch.

Other objects and advantages of the invention will become apparent from the following description, taken in conjunction with the accompanying drawings, in which:

Brief description of the drawings

FIGURE 1 is a fragmentary side elevational view of an engine driving a multi-ratio transmission embodying the novel features of the present invention.

FIG. 2 is an enlarged cross-sectional view taken substantially along the line 2—2 of FIG. 1 and showing one of the caps with its end or cover plate removed.

FIG. 3 is a cross-sectional view taken generally in a plane parallel to the plane of FIG. 2 and showing more of the valve mechanisms, the view being taken substantially along the line 3—3 of FIG. 4 with parts broken away for clarity of illustration.

FIG. 4 is an enlarged fragmentary cross-section taken along the line 4—4 of FIG. 2 with some parts broken away and shown in section.

FIG. 5 is an enlarged fragmentary view similar to the lower portion of FIG. 3 with the valve mechanism in the clutch-actuating condition.

FIG. 6 is a cross-sectional view taken along the line 6—6 of FIG. 4.

FIG. 7 is an enlarged fragmentary cross-sectional view taken along the line 7—7 of FIG. 3.

FIG. 8 is a fragmentary view similar to part of FIG. 3 and showing a modified form of the invention.

FIG. 9 is a schematic view showing the hydraulic circuit arrangement and the basic elements of part of the illustrative transmission embodying the novel features of the present invention.

Description of the preferred embodiment

As shown in the drawings for purposes of illustration, the invention is embodied in a multi-ratio transmission 10 (FIG. 1) driven by an engine 11 through a modulated clutch and torque converter 12 and a coupling 13, and itself driving a shaft 14 coupled at 15 to the output 17 of the transmission. A typical application of such a transmission is a crawler-type tractor (not shown) wherein the engine is run at a substantially constant speed and changes in the operating speed of the tractor are accomplished by the operator with a remotely located control such as a lever 18 with which the operator selects different gear ratios in the transmission and also may change the direction of drive of the shaft 14 to reverse the tractor.

Within the housing 19 of such a transmission is an output shaft 20 (FIG. 9) which is journaled in suitable bearings (not shown) for rotation about its longitudinal axis and is drivingly connected to the output coupling 15 to drive the shaft 14. Also journaled in the housing are one or more input shafts 21 which herein are supported in axially spaced anti-friction bearings 22 for rotation about axes parallel to the axis of the output shaft, one of these input shafts being shown in FIG. 9 and in part in FIG. 4 wherein it will be seen that the right end portion of the shaft projects through and beyond a bearing 22 having an outer race 23 fitted in an opening 24 in the right side of the housing and an inner race 25 telescoped over a cylindrical enlargement 27 adjacent the end of the shaft. A bearing cap 28 covers the projecting end of each input shaft, two such caps being shown in FIG. 1.

As shown schematically in FIG. 9, two transmission gears 29 and 30 are fast on the output shaft 20 in axially spaced relation within the housing 19, and each of these gears meshes two other transmission gears 31 and 32 journaled on the input shaft 21 by bearings 33 which permit free rotation of the gears on the shaft. The two sets of meshing gears thus provided have different gear ratios for driving the output shaft at different speeds and with different power ratios when different gears 31, 32 are coupled to the input shaft, the latter being driven by the engine 11 through gearing including the gears 34 shown at its right end in FIG. 9.

To effect the selective coupling of the different input gears 31, 32 to the input shaft 21, fluid-actuated clutch mechanisms 35, 37 (FIG. 9) act between the input shaft 21 and the respective input gears in response to signals initiated by the tractor operator with the control lever 18. For this purpose, each clutch mechanism herein comprises a plurality of disks 38 rotatable with the input shaft and projecting outwardly therefrom, a plurality of similar disks 39 rotatable with an annular flange 40 on the associated input gear 31, 32 and extending inwardly from the flange in alternating overlapping relation with the disks 38, and a hydraulic actuator 41 for shifting the sets of disks axially and into clutching frictional engagement with each other.

In this instance, the input gears 31 and 32 are suitably held against axial movement on the input shaft 21 and the two sets of disks 38 and 39 of each clutch are keyed at 42 to the output shaft and the flange 40 to be shifted axially by the hydraulic actuator 41. While two actuators may be formed separately in a manner well known to those skilled in the art, the illustrative transmission has a duplex actuator comprising a piston 43 fast on the input shaft, and a movable cylinder 44 disposed around the piston and the shaft and cooperating therewith to define two pressure chambers 45 and 47 on opposite sides of the piston. Suitable O rings provide seals between the relatively movable surfaces of the piston and the cylinder and between the latter and the shaft.

On the opposite ends of the cylinder 44 are coaxial, axially extending annular ribs 44ª for pushing the disks 38 and 39 in the direction of movement of the cylinder. Thus, as the cylinder moves to the left in response to the delivery of pressure fluid to the left chamber 45, the disks on the left side of the cylinder are shifted to the left into clutching engagement with each other to couple the gear 31 to the input shaft. Movement of the cylinder to the right engages the two sets of disks of the clutch 37 to couple the gear 32 to the input shaft. It will be seen that only one clutch may be engaged at any moment because movement of the cylinder in one direction to engage one clutch simultaneously disengages the other.

The pressure fluid for moving the cylinder 44 is supplied by an outside source and delivered to the cylinder through two passages 48 and 49 formed in and extending longitudinally of the input shaft and opening outwardly or radially, as shown in FIG. 9, into the two chambers 45 and 47. Adjacent the projecting end of the input shaft, the left end in FIG. 9, these passages open outwardly into axially spaced grooves 50 and 51 encircling the projecting end portion of the shaft beyond the bearing 22 (see FIG. 4) to receive actuating fluid from the source which herein is a pump 52 shown only in FIG. 9. The flows to and from the passages are controlled by valves responsive to the movements of the control lever 18 by the tractor operator. When fluid is delivered through the passage 48 to the chamber 45 while the passage 49 is vented, the cylinder 44 is shifted to the right to engage the clutch 37, and when fluid is delivered through the passage 49 to the chamber 47 while the passage 48 is vented, the clutch 38 is engaged.

In accordance with the present invention, valve mechanisms for controlling the flow of actuating fluid to and from the passages 48 and 49 are mounted on the bearing caps 28 which thus serve the additional function of housing these valves closely adjacent to the input shafts 21 where the valves admit fluid directly into the shaft passages in response to signals from the operator, thereby reducing to a minimum any time lag between valve actuation and clutch engagement. Moreover, since the control valve mechanisms may be actuated electrically, the only pressure line needed for delivery of fluid to the control is a single supply line 53 which may serve several sets of control valves, thereby eliminating the need for relatively expensive, space-consuming and sometimes troublesome tubing, hoses, clamps and the like between the control valves and the input shaft. The result is a materially simpler and more rapidly responsive control for the clutch mechanisms.

In this instance, each bearing cover or cap 28 is formed as a cylindrical body 54 (see FIG. 4) having a closed-ended center bore 55 into which the input shaft 21 projects and in which the shaft is journaled in a pilot bearing 57. The body is bolted to the transmission housing 19 as shown in FIGS. 1 and 6, and is formed with two cylindrical recesses 58 in the end opposite the housing for receiving two actuating valves 59 and 60. These recesses are disposed on opposite sides of the central bore, and have smaller extension passages 61 which open into a counterbore 62 in the side of the body adjacent to the housing.

It will be seen in FIG. 4 that each of the actuating valves 59, 60 is a solenoid-operated valve having a coil package 63 fitted in the bore 58 with a neck 64 threaded into the adjacent end of the extension passage 61, and with an armature in the form of a plunger 65 loosely guided in the coil and projecting to the left through the neck, the plunger normally being held against a plug 67 by a coiled spring 68 compressed between a collar 69 on the end of the plunger and the bottom of a counterbore 70 in the neck. Each plug 67 is pressed into the left end of the extension passage 61 and is formed with a passage 71 extending through the plug between the extension passage and the space 72 defined by the counterbore 62 alongside the bearing 22.

Fitted over and bolted to the outer end of the cap body 54 is a cover plate 73 (FIGS. 1 and 4) which forms a manifold for delivering actuating fluid to the two solenoid valves 59, 60. For this purpose, the cover plate has an inlet passage 74 carrying fluid from the supply line 53, which is connected to the central portion of the plate, to each of the solenoid valves. Stems 75 fitted tightly in the right end portions of the solenoid coils 63, and held in place by lock nuts 77, project into the open ends of the manifold passage and are formed with central passages 78 through which fluid flows. This fluid then leaks through the space 79 around the plungers 65 into the extension passages 61.

When the coils 63 are deenergized and the plungers 65 are positioned as shown in FIGS. 4 and 9, the passages 71 through the plugs 67 are closed and the fluid in the extension passages 61 flows through branch lines 80 and 81 (FIGS 3–5 and 9) which, in the preferred embodiment of the invention lead to two so-called "slave" valves 82 and 83 which are operated by pilot pressure from the solenoid valves and themselves control the flow of actuating fluid to the clutches 35 and 37. As will be seen most clearly in FIGS. 3 and 9, each of these valves comprises a spool having two spaced lands or heads 84 and 85 and slidable endwise back and forth in a bore 87 between normal and actuating positions adjacent the opposite ends of the bore, which extends into the body from an external shoulder 87ª as shown in FIGS. 3 and 5. The spool of the valve 82 is urged to the right in FIG. 3 into its normal position by a coiled spring 88 compressed between the left end of the spool and a plug closing the left end of the bore, and the spool of the other valve 83 is urged to the left by a similar spring 88 compressed between the right end of the spool and another plug closing the right end of this bore.

In the normal position of each slave valve 82, 83, the branch line 80, 81 from the associated solenoid valve 59, 60 opens into the portion of the bore housing the spring 88 and thus assists the spring in holding the spool in its normal position with a vent port 89, herein formed by two bores (see FIG. 7), communicating with a clutch port 90 opening into a clutch passage 91 or 92 both of which extend inwardly toward the central bore 55 of the cap body 54. The vent port bores 89 lead to the space 72 formed by the counterbore 62 and thence to a drain line 93 (see FIG. 9) for returning fluid to a sump or reservoir 94, and the clutch passages 91 and 92 communicate with the grooves 50 and 51 into which the shaft passages 48 and 49 open. Accordingly, in this condition of the valves, the clutch chambers 45 and 47 are vented and both clutches 35 and 37 are disengaged.

At the end of each valve spool opposite the spring 88 is a chamber 95 continuously pressurized by actuating fluid delivered to the chamber through a passage 97 (FIG. 6) and a branch line 74a (FIGS. 6 and 9) from the main supply passage 74. Thus, whenever the pressure is relieved at the other end of the spool, the pressure exerted by the actuating fluid in chamber 95 overcomes the spring and shifts the spool endwise into its actuating position as shown in FIG. 5. This is accomplished by energizing the associated solenoid coil 63 to draw the plunger 65 thereof away from its normal position and into an actuating position spaced from the plug 67, thereby opening the extension passage 61 to the drain passage 71 so that the pressure fluid may exhaust through the plug into the space 72 and back to the sump 94 through the line 93 as shown in FIG. 9.

When the spool of a slave valve 82, 83 is in its actuating position (FIG. 5), a pressure-supply port 98 formerly closed by the head 85 now communicates with the associated clutch port 90. In each case, the clutch port communicates through passages 98a (FIG. 6) with the branch passage 74a (FIGS. 6 and 9) and the supply passage 74, therefore delivers actuating fluid through the clutch passage 91 or 92 to one of the transfer grooves 50 or 51 for delivery to the clutch 35 or 37 that is to be engaged. As this fluid is delivered to one chamber 45, 47 and forces the cylinder 44 in one direction, the fluid exhausted from the other chamber flows out through its shaft passage back to the inactive slave valve and reversely through the clutch passage 91 or 92 across the valve bore 87 and out through the vent port 89 communicating with the clutch port 90.

As long as the coil 63 of the associated solenoid valve 59, 60 is energized, the slave valve spool is held in its actuating position to maintain engagement of the associated clutch 35, 37. When the coil is deenergized, however, its plunger 65 returns to its normal position closing the drain passage 71 to pressurize the extension passage 61, the branch passage 80 or 81, and the space surrounding the return spring 88 of the slave valve. Then the combined force of the spring and the pressure fluid are sufficient to return the spool to its normal position in which the associated clutch chamber 45 or 47 is vented. Accordingly, the clutch is disengaged to deactive the previously selected transmission gearing.

Such disengagement may take place as an incident to the shifting of the transmission into neutral, the selection of another set of gearing on the same input shaft, or the selection of other gearing on another input shaft. As the control lever 18 is shifted from one position to another, it first opens the switch for a solenoid associated with one set of gears and then closes the switch for another solenoid associated with another set of gears, electrical lead-ins for the solenoids being shown at 63a in FIG. 1 and in part in FIG. 4. Immediately after closure of one of the signal switches, the associated solenoid coil is energized to open its drain passage 71 and vent the spring-end of the spool bore 87 for immediately actuation of the associated slave valve to engage the associated clutch. The reduction of delays between the signaling and the response minimizes acceleration and overrunning of the drive mechanism during shifting and thus diminishes shocks experienced by the mechanism in service use. Pressure-actuated switches 99 (FIGS. 2 and 9) sense the pressures in the passages 91 and 92 and control the operation of related devices of the transmission.

*Description of the modified form of the invention*

Instead of using the solenoid valves 59 and 60 to control the position of slave valves 81 and 82 as described above and shown in FIGS. 1–7 and 9, directly connected solenoid valves such as that shown at 59′ in FIG. 8 may be used to control the flow of actuating fluid from the pressure ports 98 through the valve bores 87 to the associated passages 91 and 92 and thus to the transfer grooves 50 and 51 communicating with the shaft passages 48 and 49 leading to the hydraulic actuators. In this form, the solenoid coils are enclosed in casings 100, each fastened to one of the external shoulders 87a on the cap body 54 with the solenoid plungers 102 fastened to the ends of spools slidable back and forth in the bores 87, only one modified valve mechanism being shown in FIG. 8 for purposes of illustration.

A compression spring 103 is coiled around the solenoid plunger 102 to hold the valve spool in normal, deenergized position shown in FIG. 8, one head 85 of the spool closing the pressure port 98, as before, and the other head 84 being beyond the vent port 89 so that the latter communicates through the bore with the clutch passage 91. Additional vent ports 104 and 105 open into the bore on opposite sides of the spool, so the spring alone normally holds the spool in the position shown. Thus, the clutch chambers 45 and 47 normally are vented through the ports 89 of the two valve mechanisms and the clutches 35 and 37 are disengaged.

When a solenoid coil is energized in response to movement of the operating lever 18 (FIG. 1), the valve spool in FIG. 8 is shifted to the left far enough to uncover the port 98 and cover the vent port 89 with the head 84, the port 98 then communicating through the bore 87 with the clutch passage 91 to engage the associated clutch, holding the clutch in engagement as long as the solenoid is energized. When the solenoid is deenergized, the spring 103 returns the spool to the position shown in FIG. 8 to vent the clutch chamber and thereby disengage the clutch. This arrangement has the same advantages in location as the valve mechanism and rapid response of the clutches as in the preferred form and is somewhat simpler in construction, but requires solenoids capable of effecting the direct movement of the valve spools.

*Brief summary of operation, FIG. 9*

The schematic diagram in FIG. 9 shows the various parts of the preferred embodiment in normal, deenergized condition ready for engagement of either of the clutches 35, 37 in response to a signal from the operator. The two solenoid coils 63 are deenergized, so the plungers 65 are held in their normal positions by the springs 68 and thus engage the plugs 67 to close the drain passages 71. Accordingly, actuating fluid from the supply line 53 flows through the solenoids, leaks around the plungers 65, and pressurizes the extension passages 61, and passages 80 and 81, and the ends of the bores 87 housing the springs 88 of the two slave valves 82 and 83.

In this condition of the valve mechanisms, the springs 88 and the cooperating actuating fluid hold the valve spools in their normal positions in which the pressure ports 98 are closed and the vent ports 89 communicate through the shaft passages 48 and 49 with the clutch chambers 45 and 47. When the operator shifts the control lever 18 to a position calling for engagement of one of the clutches, the appropriate solenoid 63 is energized to draw its plunger 65 away from the plug 67 and into its actuating position to vent the extension passage 61 through the drain passage 71. This also vents the valve spring chamber so that the pressure at the other end 95 can overcome the spring 88 and shift the spool to its actuating position as shown in FIG. 5. Now the vent port 89 is closed by the head 84 and the clutch passage 91, 92 is pressurized by actuating fluid from the pressure port 98 to shift the cylinder 44 in the direction to engage the selected clutch 35, 37 and drive the selected set of transmission gears.

When the coil 63 is deenergized, the spring 68 returns the plunger 65 to its normal position closing the drain passage 71 so that fluid leaking past the plunger acts through the passage 80 or 81 to pressurize the spring chamber in the valve bore 87. Thus, the slave valve spool is returned to its normal position by the pressure fluid and the spring, and the pressure port 98 is closed as the vent port 89 is returned to communication with the formerly pressurized clutch chamber 45 or 47 to disengage the clutch 35, 37.

With the control valve mechanism (either with or without slave valves) mounted closely adjacent the ends of the shafts defining the flow passages 48, 49 for actuating fluid, and operated immediately upon demand by the tractor operator, delays between the demand and the response are reduced to a minimum. Moreover, only one fluid line 53 is needed for each control, thereby simplifying the accompanying structure.

I claim as my invention:

1. In a multi-ratio transmission having a housing, input and output shafts journaled in said housing, first and second transmission gears each journaled on said input shaft and fast on said output shaft for rotation therewith, first and second clutches acting between said transmission gears and said input shaft to couple the associated gear to the input shaft when the clutch is engaged, hydraulically actuated mechanism for engaging and disengaging each of said clutches thereby to select different gears for transmitting power between said shafts, and first and second fluid passages formed in said input shaft and communicating at one end with said hydraulically actuated mechanisms, each of said passages opening at the other end through an exposed end portion of said input shaft in axially spaced relation along the shaft, the improvement comprising, a cover mounted on said housing around said exposed end portion, a single line supplying pressure fluid to said cover, first and second valve mechanisms mounted on said cover and each having a solenoid operator and a plunger movable back and forth by said operator between normal and actuating positions, transfer means in said housing establishing communication between said first valve mechanism and said first passage and between said second valve mechanism and second passage, means responsive to movement of said plungers to said actuating positions to control the flow of fluid between said line and said passages, and a control remote from said cover for selectively energizing and deenergizing each of said solenoid operators thereby controlling the engagement and disengagement of said clutches.

2. In a multi-ratio transmission having a housing, input and output shafts journaled on said housing, first and second transmission elements each drivingly engaging one of said shafts, fluid actuated mechanisms for drivingly connecting each of said elements selectively to the other shaft to transmit power from said input shaft through the connected transmission element to said output shaft, and first and second fluid passages in said other shaft each communicating at one end with one of said fluid actuated mechanisms and opening at the other ends through an exposed end portion of said other shaft, the improvement comprising, a cover mounted on said housing around said exposed end portion, a single line supplying actuating fluid to said cover, a pair of valve mechanisms mounted directly on said cover and controlling the delivery of actuating fluid from said line to said passages, each of said valve mechanisms having a member movable from a normal position to an actuating position to cause the actuation of one of said fluid actuated mechanisms, and means for selectively operating said valve mechanisms from a location remote from said cover to shift the movable member of the selected valve mechanism to said actuating position on demand.

3. A multi-ratio transmission as defined in claim 2 in which said other shaft is journaled on said housing by means including a bearing adjacent said exposed end portion, and said cover is a bearing cap disposed around said exposed end portion, said valve mechanisms being housed in said bearing cap to receive actuating fluid from said supply line and admit said fluid into a selected passage in said other shaft to actuate the associated fluid actuated mechanism.

4. A multi-ratio transmission as defined in claim 3 in which said valve mechanisms include means for venting said fluid-actuated mechanisms through said bearing when said members are in said normal positions.

5. A multi-ratio transmission as defined in claim 2 in which each of said valve mechanisms includes a solenoid housed in said cover, said members being solenoid plungers movable into said actuating positions when the solenoid is actuated, and said operating means being a selector controlling the energization of said solenoids.

6. A multi-ratio transmission as defined in claim 5 further including fluid-positioned slave valves movable from said normal positions to said actuating positions by pilot fluid passing said plungers when said solenoids are actuated, said slave valves controlling the flow of actuating fluid from said line to said passages.

7. In a multi-ratio transmission having a housing, input and output shafts journaled on said housing, at least one transmission element drivingly connected to one of said shafts, fluid actuated mechanism for drivingly connected and disconnecting said element and the other shaft for transmission of power from said input shaft through said element to said output shaft, and at least one fluid passage in one of said shafts for carrying actuating fluid to said machanism, said passage opening through an exposed end portion of the shaft, the improvement comprising, a cover mounted on said housing, around said exposed end portion, supply means for delivering actuating fluid to said cover, an electrically operated valve mechanism mounted directly on said cover and controlling the delivery of actuating fluid to said passage, and an electrical control remote from said cover for operating said valve mechanism and thereby actuating said fluid actuated mechanism.

8. A multi-ratio transmission as defined in claim 7 in which said cover forms a bearing cap for said exposed end portion, and said valve mechanism includes a member movable back and forth in said cap between normal and actuating positions, and means for carrying actuating fluid between said supply means and said passage when said member is in said actuating position.

9. A multi-ratio transmission as defined in claim 8 in which said supply means is a single line opening into said bearing cap.

References Cited

UNITED STATES PATENTS

| | | | |
|---|---|---|---|
| 2,825,234 | 3/1958 | Papst | 74—364 |
| 2,953,941 | 9/1960 | Schwartz et al. | 74—364 |
| 2,979,963 | 4/1961 | Snoy | 192—87.19 |
| 3,040,408 | 6/1962 | Schou | 74—364 |

DONLEY J. STOCKING, *Primary Examiner.*

HENRY S. LAYTON, *Assistant Examiner.*